(No Model.)

C. W. & A. S. GAGE.
SAW.

No. 303,720.        Patented Aug. 19, 1884.

Witnesses:
Edw. W. Down Jr.
E. L. Miles

Inventors:
C. W. Gage
A. S. Gage
per Edw. W. Down &c,
Attys.

UNITED STATES PATENT OFFICE.

CHARLES W. GAGE AND ADELBERT S. GAGE, OF HOMER, NEW YORK.

SAW.

SPECIFICATION forming part of Letters Patent No. 303,720, dated August 19, 1884.

Application filed April 14, 1884. (No model.)

*To all whom it may concern:*

Be it known that we, CHARLES W. GAGE and ADELBERT S. GAGE, citizens of the United States, residing at Homer, in the county of Cortland and State of New York, have invented certain new and useful Improvements in Saws or Cutters in Wood; and we do hereby declare the following to be a full, clear, and exact description of the invention, such as will enable others skilled in the art to which it appertains to make and use the same.

Our invention relates to saws, and has for its object the production of a saw peculiarly adapted for use in cutting or slicing veneers.

In an application for a veneer-sawing machine filed by us on the 22d day of January, 1884, Serial No. 118,282, we showed and described some of the features of the present invention. In that application we showed and described the manner in which the saw was operated, and we would premise here that our saw is particularly intended for use upon machines of a character like that in the above-named application; but it has peculiarities of construction which may be adopted in a saw for any use.

In carrying our invention into effect as a veneer cutter or slicer we form the saw with the fleam or cutting teeth on each side of the clearing-tooth. The teeth, whether cutting or clearing, are set in pairs. The cutting or fleam teeth are rounded on their faces and beveled to a sharp edge on one side all around, and are bent or "set" out, so as to give the proper width of cut. The two fleam-teeth, which form a pair for each side of the clearing-tooth, are beveled and set in opposite directions to each other. The clearing-tooth is formed with curved points set in opposite directions, but in line with each other. The saw is intended for cutting on both directions of stroke. The rounded faces of the fleam-teeth, acting with equal efficiency in either direction, and the clearing-tooth with its double and oppositely-set points or fangs, will clear, no matter in which direction the cut is made. There may be a series of clearing-teeth with a pair of fleam-teeth between them, the saw of course beginning and ending with a pair of fleam-teeth.

The accompanying drawings illustrate our invention.

Figures 1, 2:
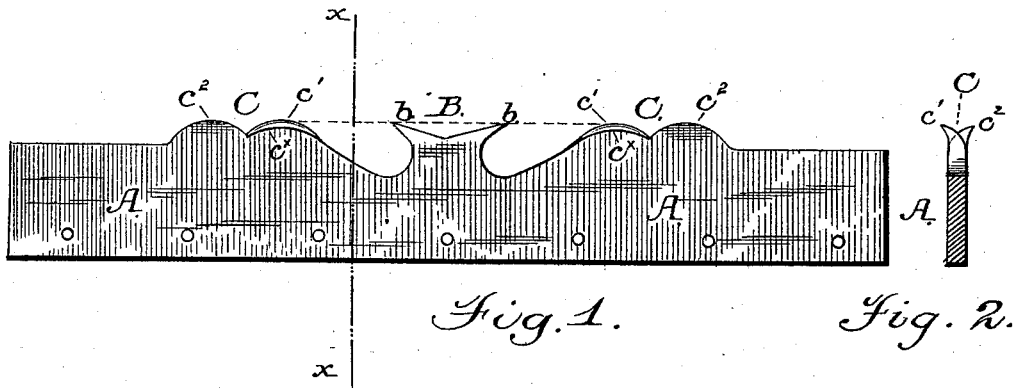
Figure 3:
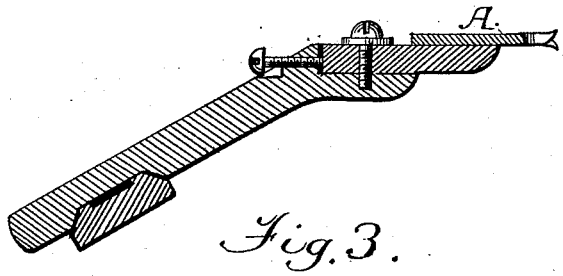

Figure 1 is a plan view of the saw. Fig. 2 is a section of same on line $x\ x$, Fig. 1. Fig. 3 shows a portion of the supporting-frame in section.

Similar letters of reference indicate corresponding parts in all the figures.

A is the saw blade or body, and B the clearing-tooth.

C designates a pair of fleam-teeth, one of which, $c'$, may be described as follows: Both faces are rounded, and the tooth is beveled or sloped on one side, as shown at $c^*$, Fig. 1. The tooth is bent or set, as shown in the same figure. The other tooth, $c^2$, of the pair C is a copy of the tooth $c'$, with the exception that it is beveled and set in the opposite direction. The rounded faces of these teeth $c'\ c^2$ tend to separate rather than cut the wood. Being used in work where the lumber is made in convolute layers, and by splitting or separating the grain rather than removing a portion in the form of sawdust, these teeth are particularly desirable, as they do not make much chip or sawdust, and thereby tend to economize the material, which is often very valuable and scarce. What material they do loosen, however, is carried off by the clearing tooth or teeth B. As already explained, this tooth is formed with two curved points or fangs, $b\ b$, set in opposite directions, but in line with each other ordinarily. The points $b\ b$ may be sharp, so as to cut the material keenly or less sharp, and merely clear the way cut by the fleam-teeth. The points $b\ b$ are given a great deal of "rake" or curvature, in order to provide space for the separated material, which is carried out by them. A pair of the fleam-teeth $c'\ c^2$ is provided on each side of the clearing-tooth B, whose points or fangs $b\ b$ project in opposite directions, one toward each pair of fleam-teeth.

Although we have shown the saw constructed with only one clearing-tooth, with a pair of fleam-teeth on each side of it, yet we would not be understood as confining ourselves to this single set, as a series of fleam and clearing teeth may be placed upon the same blade, alternating with each other. In such case the series must always begin and end with a pair of the fleam-teeth; and although we have described the saw as used in slicing veneers, it is equally applicable in all situations where the cut is made with the grain of the wood.

Where it is desired to do more actual sawing—that is, where a chip or sawdust is to be taken out—the fleam-teeth may be rounded on one face only.

We are aware of the Patents Nos. 245,114, 238,521, and 211,346, which show in various forms alternating cutting and clearing teeth; but to these and the broad principle involved we make no claim, having now limited our claim to the exact form shown and described in our specification.

We are aware that saws have been patented and are in use having cutting-teeth alternating with clearing-teeth, both single and double in form, and notably among such we mention the patents of Osgood, No. 238,521, Ashenfelter, No. 245,114, and Robbins, No. 211,346. To such, therefore, broadly, we make no claim. We have, after experiment with especial view to facility and execution in practical work, produced what we believe to be a cutter having advantages of form over any of which we have a knowledge. Among the advantages to our cutter we make mention of the peculiar form of our cutting-teeth, which, being segmental or semicircular in form, are adapted to present an entry to the wood from either direction without unnecessarily tearing the fiber and roughening the surfaces of the plank or veneers. The double-pointed clearing-tooth with its angular points and the angular recess between said points may be mentioned, the former being well adapted for clearing out the extraneous matter and the latter affording space for its discharge freely. The deep concave recesses on either side of the clearing-tooth are arranged and provided especially to facilitate the discharge of dust and broken fiber during the operation of the cutter back and forth.

Having thus described our invention, what we desire to claim, and secure by Letters Patent, is—

A blade for cutting wood, provided with two sets of cutting-teeth, segmental or semicircular in form, and an intermediate clearing-tooth formed with two acute-angle points set in opposite directions toward the said cutting-teeth, being separated from the latter by deep concave recesses, substantially as and for the purpose set forth.

In testimony whereof we affix our signatures in presence of two witnesses.

CHARLES W. GAGE.
ADELBERT S. GAGE.

Witnesses:
A. P. HENDERSON,
L. HOLDRIDGE.